United States Patent
Hsu

(10) Patent No.: US 8,425,127 B2
(45) Date of Patent: Apr. 23, 2013

(54) OPTICAL FIBER COUPLING CONNECTOR

(75) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 50 days.

(21) Appl. No.: 13/221,867

(22) Filed: Aug. 30, 2011

(65) Prior Publication Data

US 2012/0294570 A1    Nov. 22, 2012

(30) Foreign Application Priority Data

May 20, 2011    (TW) ............................. 100117874 A

(51) Int. Cl.
*G02B 6/38*    (2006.01)
(52) U.S. Cl.
USPC .......................................................... 385/74
(58) Field of Classification Search ............... 385/74
See application file for complete search history.

(56) References Cited

U.S. PATENT DOCUMENTS

2005/0220423 A1*   10/2005   Asano ............................. 385/74
2009/0214157 A1*    8/2009   Okubo et al. ................... 385/14
2011/0158589 A1*    6/2011   Lin .................................. 385/74

FOREIGN PATENT DOCUMENTS

JP            11337771 A  * 12/1999

* cited by examiner

*Primary Examiner* — Ryan Lepisto
*Assistant Examiner* — Jerry Blevins
(74) *Attorney, Agent, or Firm* — Altis Law Group, Inc.

(57) ABSTRACT

An optical fiber coupling connector includes a body and a cover attached on the body. The body includes a front surface, a lens portion arranged at the front surface, a rear surface, a top surface, an optical fiber groove defined in the top surface, and an optical fiber accommodated in the optical fiber groove. The optical fiber groove extends from lens portion to the rear surface. The cover includes an elongate retaining groove fittingly engaged with the optical fiber groove. The retaining groove is configured for fixing the optical fiber in the optical fiber groove.

13 Claims, 5 Drawing Sheets

OPTICAL FIBER COUPLING CONNECTOR

BACKGROUND

1. Technical Field

The present disclosure relates to communication technology, especially relating to optical fiber coupling connectors.

2. Description of Related Art

Optical fiber coupling connectors are used to transmit optical signals between two devices. An optical fiber coupling connector includes at least one hole to accommodate an optical fiber. The hole is often a blind hole with one opening for inserting the optical fiber. Because the hole is very narrow, a mold core insert for forming such a hole is required to also be very narrow and must also be very precise to fit the outline of the optical fiber well. Furthermore, because the current holes have only one small opening, it is difficult to insert the optical fibers.

What is needed, therefore, is an optical fiber coupling connector with special optical fiber grooves, which easily accommodates an optical fiber and has allows for greater tolerances for the mold insert.

BRIEF DESCRIPTION OF THE DRAWINGS

Many aspects of the present optical fiber coupling connector can be better understood with reference to the following drawings. The components in the drawings are not necessarily drawn to scale, the emphasis instead being placed upon clearly illustrating the principles of the present optical fiber coupling connector. Moreover, in the drawings, like reference numerals designate corresponding parts throughout the views.

DETAILED DESCRIPTION

Figure 1:
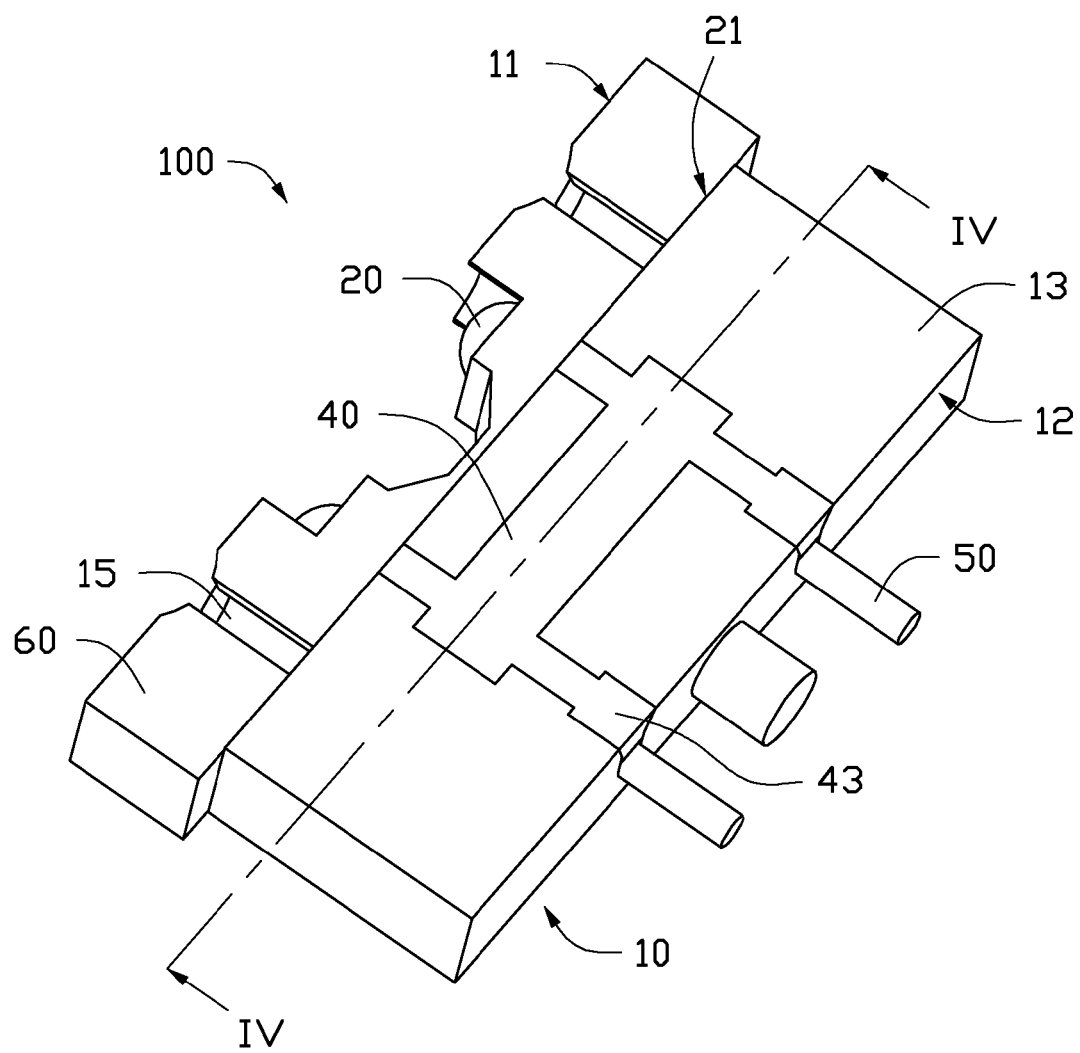
FIG. 1 shows a schematic view of an optical fiber coupling connector in accordance with an exemplary embodiment.
Figure 2:
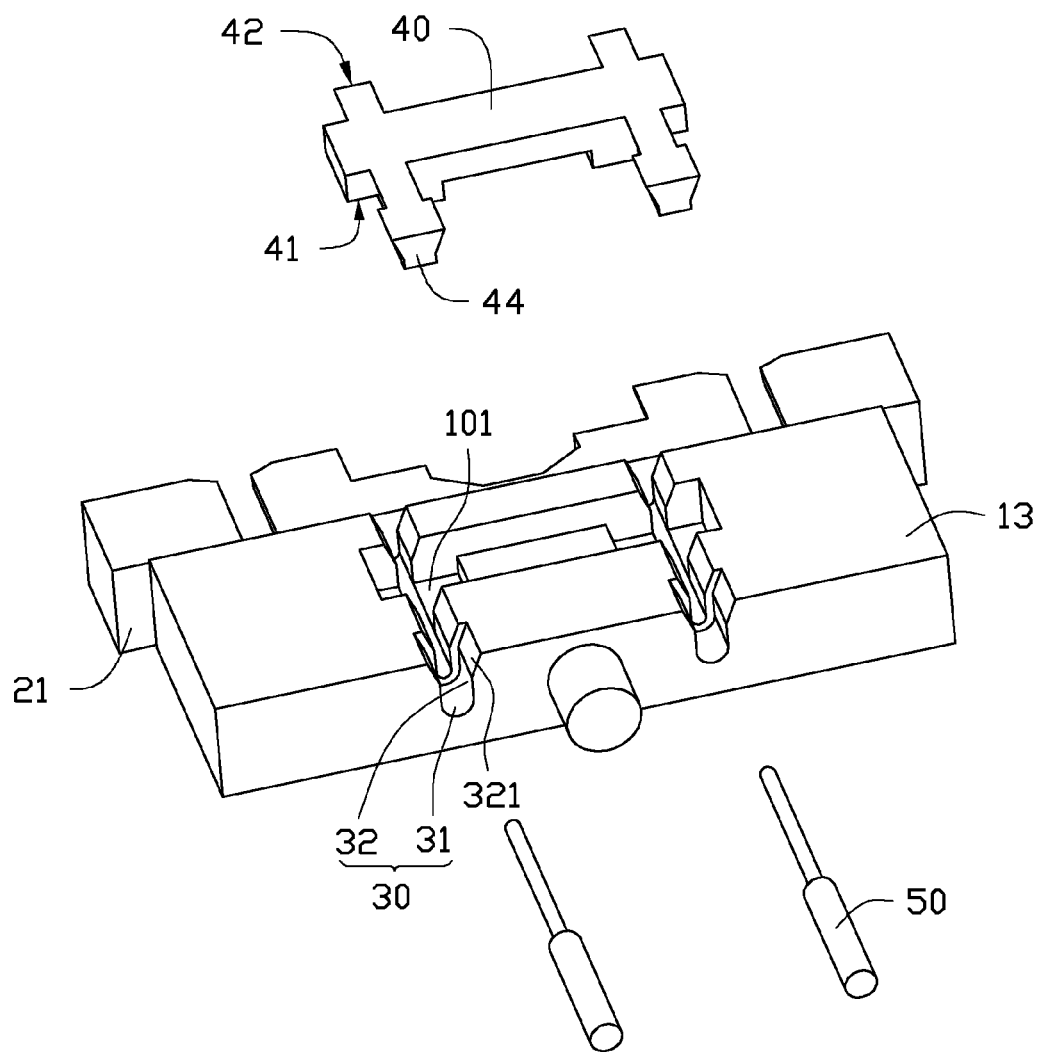
FIG. 2 is a partially exploded view of the optical fiber coupling connector of FIG. 1.

Referring to FIGS. 1 and 2, an optical fiber coupling connector 100 includes a body 10 and a cover 40. The body 10 mainly includes at least one lens 20, at least one corresponding optical fiber groove 30 open to the outside, and at least one corresponding optical fiber 50 accommodated in the optical fiber groove 30. The cover 40 is attached on the body 10 and covers the at least one optical fiber groove 30.

The body 10 has a front surface 11 at a front end, where a lens portion 60 is located. The body 10 also has a rear surface 12 at a rear end, a light incident plane 21, and a top surface 13 substantially perpendicularly connecting the light incident plane 21 and the rear surface 12.

The lens portion 60 is the part between the front surface 11 and the light incident plane 21, and is mainly configured to fix the lens(es) 20 and defines a number of fixing groove(s) 15 for fixing another optical fiber coupling connector (not shown). The lens(es) 20 is/are plane-convex lens(es) in this embodiment. The optical axis of one lens 20 substantially coincides with a central line of a corresponding optical fiber 50.

The light incident plane 21 is the plane where the end of one optical fiber grooves 30 and the end of one optical fibers 50 are located. That is, light in the optical fiber 50 is incident on the lens 20 at the incident plane 21, or vice-versa. The light incident plane 21 may coincide with a focal plane of a corresponding lens 20.

The top surface 13 defines the optical fiber grooves 30. The optical fiber grooves 30 are substantially parallel to each other. The optical fiber grooves 30 run through the body 10 from the rear surface 12 to the light incident plane 21. Each optical fiber groove 30 is open to the outside when the cover 40 is removed. Each optical fiber groove 30 includes a curved bottom 31 conforming to an outline of the optical fiber 50 and two inner sidewalls 32 facing each other to sandwich the optical fiber therebetween. The two sidewalls 32 may be substantially perpendicular to the top surface 13. The curved bottom 31 and the two sidewalls 32 make the optical fiber groove30 have a substantially U-shaped cross section. The curved bottom 31 conforms to the outline of a bottom part of the optical fiber 50.

Figure 3:
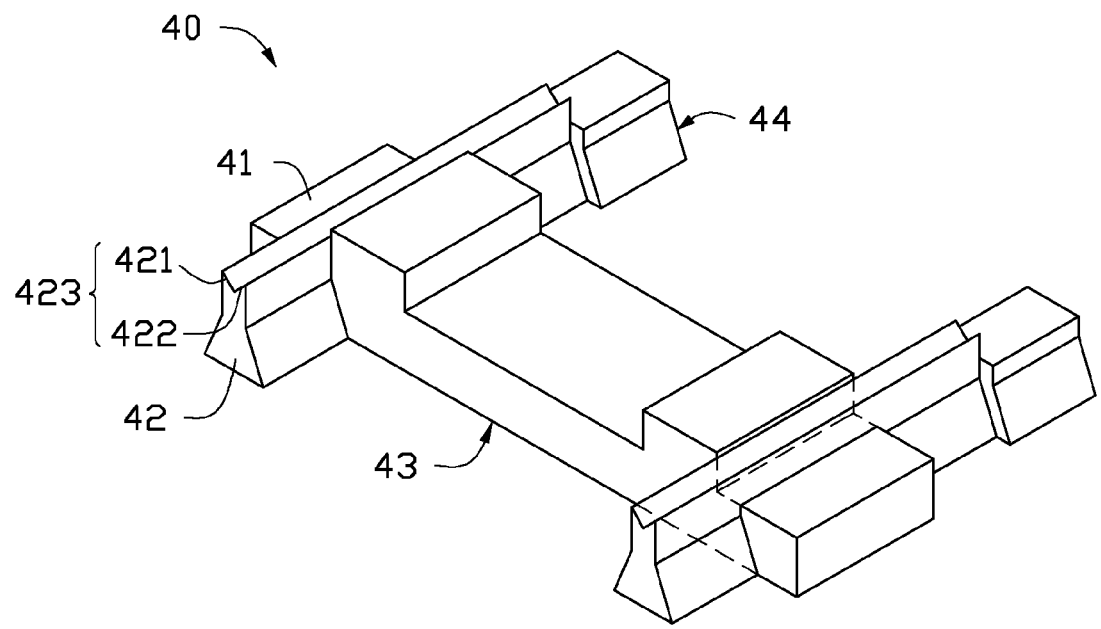
FIG. 3 shows a schematic view of a cover of FIG. 2 from bottom view.

Referring to FIGS. 2 to 3, the cover 40 has a proximal end 44 and an opposed distal end 42. The distal end 42 contacts with the light incident plane 21. To expand the top entrance of the optical fiber groove 30 for easily receiving one optical fiber 50, both of the sidewalls 32 adjacent to the body 10's one end corresponding to the proximal end 44 include a chamfer ends 321 adjacent to the top surface 13.

The cover 40 includes at least one elongate retaining groove 423 corresponding to the at least one optical fiber groove 30 and ended at the distal end 42. The cover 40 includes an engaging surface 41 at a bottom thereof and facing and contacting an inner bottom surface 101 inside the body 10. Some adhesive may be applied to the inner bottom surface 101 to fix the cover 40 in place. The retaining grooves 423 is protruding from the engaging surface 41. The retaining groove 423 is defined by a first incline surface 421 and an opposing second incline surface 422. The retaining groove 423 is configured for fixing the optical fiber 50 in the optical fiber groove 30. The first and second incline surfaces 421 and 422 intersect at a common end, thus the retaining groove 423 includes a V-shaped cross section. The retaining groove 423 has the same length as the optical fiber groove 30, or has over half of the length as the optical fiber groove 30 (like the length shown in FIG. 3) as long as to fix the optical fiber 50 in place well. The retaining groove 423 has almost the same width at its opening as the width between the two sidewalls 32. The shape of the cross-section is not limited to the embodiment.

Figure 4:
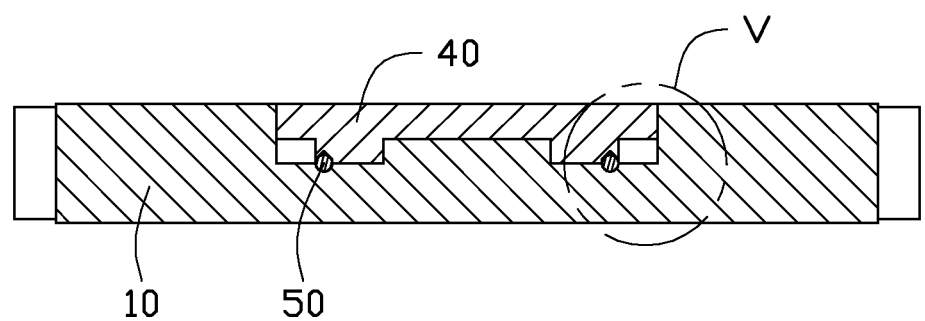
FIG. 4 is a cross-sectional view of the optical fiber coupling connector shown in FIG. 1, taken along line IV-IV.
Figure 5:
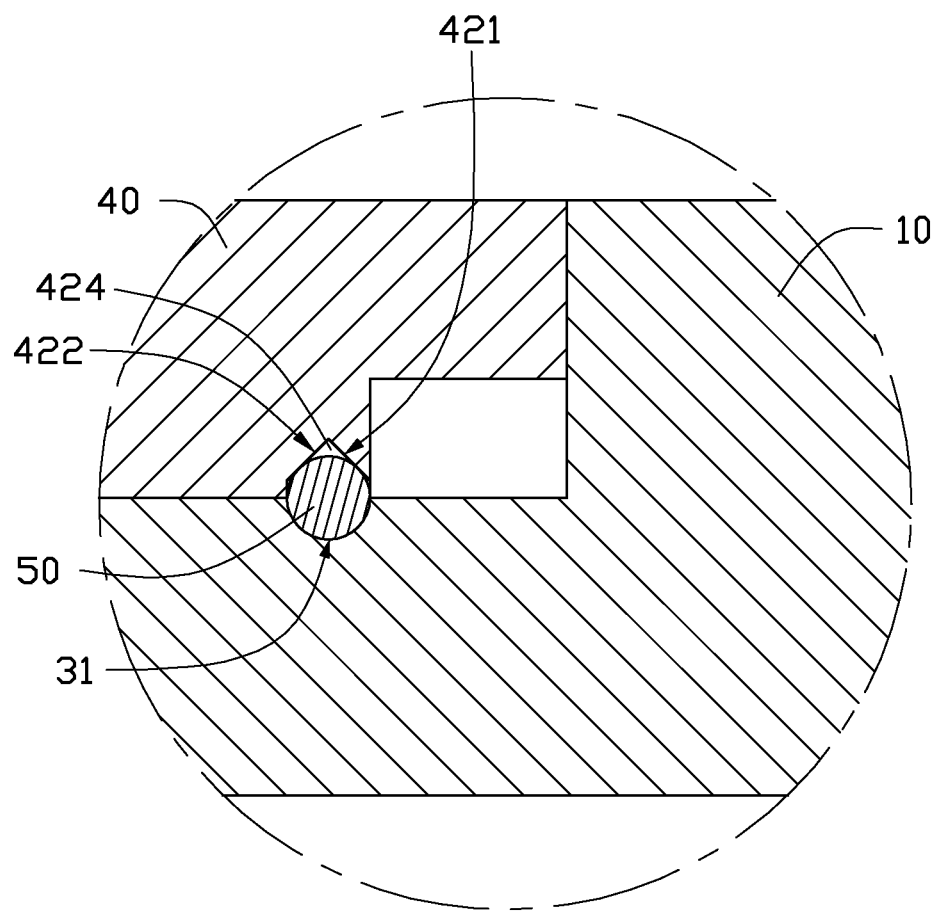
FIG. 5 is an enlarged view of circled portion V in FIG. 4.

Referring to FIGS. 4 and 5, when the cover 40 covers the optical fiber grooves 30, at least one holding spaces 424 are formed between the cover 40 and the body 10. In detail, the holding space 424 includes two parts. A top part has the V-shaped cross section and is defined by the elongated retaining groove 423, and a bottom part has the U-shaped cross section and is defined by the optical fiber groove 30. The holding space 424 firmly holds the corresponding optical fiber 50. The cover 40 includes a top surface 43 facing away from the engaging surface 41. The top surface 43 of the cover 40 is flush with the top surface 13 of the body.

Because the optical fiber groove(s) is/are open to the outside without being covered from the top direction, the optical fiber(s) 50 may be put into the optical fiber grooves 30 easily, and then the optical fiber(s) 50 are covered by the cover 40, the optical fiber(s) 50 can be fixed in place well.

The number of the retaining groove 423 and cover 40 is not limited to this embodiment. For example, there may be a single retaining groove 423 in one cover, and two such covers may used to cover two corresponding optical fiber grooves, or four such covers for four optical fiber grooves.

Before or after the optical fiber 50 is put into the optical fiber groove 30, some adhesive may be applied in the optical groove 30 to better fix the corresponding optical fiber 50 in place. The cover 40 may be made of light transmissive material, so that light-curable optical adhesive may be used.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. An optical fiber coupling connector, comprising:
   a body comprising a front surface, a lens portion arranged at the front surface, a rear surface, a top surface, an optical fiber groove defined in the top surface, and an optical fiber accommodated in the optical fiber groove, the optical fiber groove extending from lens portion to the rear surface; and
   a cover attached on the body, the cover including an elongate retaining groove fittingly engaged with the optical fiber groove, the retaining groove configured for fixing the optical fiber in the optical fiber groove,
   wherein the optical fiber groove comprises a curved bottom conforming to an outline of the optical fiber, the optical fiber groove comprises two inner sidewalls facing each other and connected with the curved bottom to sandwich the optical fiber therebetween, and both of the sidewalls comprise a chamfer end adjacent to the top surface.

2. The optical fiber coupling connector of claim 1, wherein both of the sidewalls are substantially perpendicular to the top surface.

3. The optical fiber coupling connector of claim 1, wherein the cover comprises an engaging surface facing and contacting an inner bottom surface of the body, the elongate retaining groove is defined in the engaging surface.

4. The optical fiber coupling connector of claim 3, wherein the retaining groove is protruding from the engaging surface.

5. The optical fiber coupling connector of claim 3, wherein the cover includes a top surface facing away from the engaging surface, the top surface of the cover being flush with the top surface of the body.

6. The optical fiber coupling connector of claim 1, wherein the retaining groove has the same length as the optical fiber groove.

7. The optical fiber coupling connector of claim 1, wherein the retaining groove has over half of the length as the optical fiber groove.

8. The optical fiber coupling connector of claim 1, wherein the body comprises a light incident plane between the lens portion and the optical fiber groove, the lens portion comprises a lens, and the light incident plane coincides with a focal plane of the lens.

9. The optical fiber coupling connector of claim 8, wherein the cover comprises a distal end contacting the lens portion.

10. The optical fiber coupling connector of claim 9, wherein the distal end contacts with the light incident plane.

11. The optical fiber coupling connector of claim 1, wherein the optical fiber is held inside a holding space, the holding space comprises a top part and a bottom part, the top part has a V-shaped cross section, and the bottom part has a U-shaped cross section.

12. The optical fiber coupling connector of claim 1, wherein an adhesive is applied in the optical fiber groove to fix the optical fiber in place.

13. The optical fiber coupling connector of claim 12, wherein the adhesive is a light curable optical adhesive, and the cover is made of light transmissive material.

* * * * *